United States Patent
Wolfe et al.

(10) Patent No.: US 7,054,065 B2
(45) Date of Patent: May 30, 2006

(54) DURABLE SILVER THIN FILM COATING FOR DIFFRACTION GRATINGS

(75) Inventors: Jesse D. Wolfe, Discovery Bay, CA (US); Jerald A. Britten, Oakley, CA (US); Aleksey M. Komashko, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/723,116

(22) Filed: Nov. 26, 2003

(65) Prior Publication Data

US 2004/0190141 A1    Sep. 30, 2004

Related U.S. Application Data

(60) Provisional application No. 60/458,680, filed on Mar. 27, 2003.

(51) Int. Cl.
*G02B 5/18* (2006.01)

(52) U.S. Cl. ............... 359/572; 359/569; 359/576; 359/584; 359/900

(58) Field of Classification Search ............... 359/566, 359/569, 572, 576, 580, 584, 586, 900
See application file for complete search history.

(56) References Cited

U.S. PATENT DOCUMENTS

| | | | |
|---|---|---|---|
| 5,377,045 A | 12/1994 | Wolfe et al. | |
| 5,521,765 A | 5/1996 | Wolfe | |
| 5,563,734 A | 10/1996 | Wolfe et al. | |
| 5,907,436 A | 5/1999 | Perry et al. | |
| 6,078,425 A | 6/2000 | Wolfe et al. | |
| 2002/0003635 A1* | 1/2002 | Boswell et al. ................ 359/1 |

OTHER PUBLICATIONS

Boyd et al, High-Efficiency Metallic Diffraction Gratings for Laser Applications. Applied Optics. Apr. 1, 1995/vol. 34, No. 10. pp. 1697-1706.
Britten et al, Universal Grating Design For Pulse Stretching and Compression in the 800-1100-nm Range. 1996 Optical Society of America. vol. 21, No. 7/Apr. 1, 1996. pp. 540-542.

* cited by examiner

*Primary Examiner*—Fayez G. Assaf
(74) *Attorney, Agent, or Firm*—Michael C. Staggs; Alan H. Thompson

(57) ABSTRACT

A durable silver film thin film coated non-planar optical element has been developed to replace Gold as a material for fabricating such devices. Such a coating and resultant optical element has an increased efficiency and is resistant to tarnishing, can be easily stripped and re-deposited without modifying underlying grating structure, improves the throughput and power loading of short pulse compressor designs for ultra-fast laser systems, and can be utilized in variety of optical and spectrophotometric systems, particularly high-end spectrometers that require maximized efficiency.

29 Claims, 6 Drawing Sheets

DURABLE SILVER THIN FILM COATING FOR DIFFRACTION GRATINGS

RELATED APPLICATION

This application claims the benefit of U.S. Provisional Application No. 60/458,680; filed Mar. 27, 2003, and entitled, "Durable Silver Thin Film Coating For Diffraction gratings," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to high reflectance coatings. More specifically, it pertains to a durable silver thin film high reflectance coating for diffraction gratings.

2. Description of Related Art

Diffraction gratings are used in many optical applications, including spectroscopic instruments and in chirped-pulse amplified lasers (CPA). By way of example, in the design of short pulse laser systems amplification, using the CPA technique, high energy, short pulses are typically made possible by first stretching the pulse in time, amplifying it, and then recompressing it temporally via diffraction gratings. Such short-pulse laser designs conventionally require a total of four bounces off of a system-incorporated single grating or a pair of gratings in the pulse compressor and stretcher stages. The throughput in the pulse compressor stage alone is thus proportional to the fourth power of the grating efficiency. A modest 4% increase in the diffraction efficiency of the gratings from 90 to 94% can, for example, improve throughput of the compressor stage by 20%, which results in a significant increase in laser energy to the target. While researchers have developed multi-layer dielectric coatings (MLD) to overcome the efficiency and power handling limitations of metallic gratings, such MLD gratings have limited bandwidth for very short pulse (e.g., less than 50 femtosecond) laser systems that require greater than 100 nm of band-pass.

The standard coating for metal gratings for CPA lasers is gold. Aluminum is a common overcoat for gratings for UV-visible spectroscopic applications. Silver, however, has the highest reflectivity, lowest polarization splitting, and lowest absorption from 400 nm through the infrared of all of the metals. However, silver is susceptible to attack by oxygen and constituents of atmospheric pollution, such as chlorine, sulfur, and ozone. When such substances react with the reflective coating, the silver layer becomes tarnished so that the required optical properties of that layer are lost. Specifically, the tarnish lowers the effective reflectivity of the silver coating.

An approach for applying durable silver coatings to substrates is disclosed and claimed in U.S. Pat. No. 6,078,425, titled "Durable Silver Coating For Mirrors", to Wolfe, et al, and is herein incorporated by reference in its entirety. Such a silver coating developed by Wolfe does not tarnish and can be used in harsh environments, which improves performance over traditional metallic reflectors when coated on a planar surface.

Wolfe et al., have also designed durable thin film coatings that permit light transmission in the visible range while reflecting infrared radiation. U.S. Pat. Nos. 5,377,045 and 5,521,765 to Wolfe et al. disclose thin film designs having a first layer of oxide, a layer of nickel chromium alloy, a silver layer, another layer of nickel chromium alloy, and a top layer of silicon nitride. U.S. Pat. No. 5,563,734 to Wolfe discloses silver layers sandwiched between layers of nickel-chromium nitride and silicon nitride with a further oxide outer layer. These thin films are used as filters, or substrates that are transparent to visible light, but block out infrared radiation.

Efforts on recent improvements of gratings are described in "High-efficiency metallic diffraction gratings for laser applications," by Boyd et al., Applied Optics, Vol. 34 (10), 1697–1706, "Universal grating design for pulse stretching and compression in the 800–1100 nm range," by Britten et al., Optics letters, Vol. 21 (7), 540–542, 1996, and in U. S. Pat. No. 5,907,436, titled, "Multi-layer dielectric Diffraction Gratings," issued May 25, 1999 to Perry et al.

Accordingly, a need exists for a durable metallic coating on diffraction grating surfaces so as to increase bandwidth for laser and spectroscopy systems that utilize such grating components. The present invention is directed to such a need.

SUMMARY OF THE INVENTION

The present invention provides an optical element that includes a durable silver coating on a non-planar substrate.

Another aspect of the present invention provides an optical element that includes a diffraction grating operating as a substrate and an applied tri-layer coating. Such a coating includes an adhesion layer having a predetermined thickness deposited on the diffraction grating from at least one material selected from nickel, nickel nitride, chromium, chromium nitride, nickel-chromium alloys, silicon-nitride, and nickel-chromium nitride; a layer of silver having a predetermined thickness deposited on the adhesion layer; and a passivation layer having a predetermined thickness deposited on the silver layer that includes at least one material selected from nickel, nickel nitride, chromium, chromium nitride, nickel-chromium alloys, silicon-nitride, and nickel-chromium nitride. Such a coated optical element results in a device having a diffraction efficiency of greater than about 90% over a predetermined spectral range.

A final aspect of the present invention provides a method of producing a durable silver coating on a non-planar substrate that includes: providing a non-planar profile substrate and depositing an adhesion layer on the substrate having a predetermined thickness from at least one material selected from nickel, nickel nitride, chromium, chromium nitride, nickel-chromium alloys, silicon-nitride, and nickel-chromium nitride. Then a layer of silver having a predetermined thickness is deposited on the adhesion layer with a passivation layer subsequently deposited on the silver layer having a predetermined thickness that includes at least one material selected from nickel, nickel nitride, chromium, chromium nitride, nickel-chromium alloys, silicon-nitride, and nickel-chromium nitride Accordingly, the present invention provides a method of producing a durable coating that has broadband reflective efficiency throughout the visible and near infra-red (NIR) spectrum on a diffraction grating.

Such a coating and resultant optical element of the present invention has an increased efficiency and is resistant to tarnishing, can be easily stripped and re-deposited without modifying underlying grating structure, improves the throughput and power loading of short pulse compressor designs for ultra-fast laser systems, and can be utilized in variety of optical and spectrophotometric systems, particularly high-end spectrometers that require maximized efficiency.

BRIEF DESCRIPTION OF THE DRAWINGS

The accompanying drawings, which are incorporated into and form part of this disclosure, illustrate embodiments of the invention and together with the description, serve to explain the principles of the invention.

DETAILED DESCRIPTION OF THE INVENTION

Referring now to the drawings, specific embodiments of the invention are shown. The detailed description of the specific embodiments, together with the general description of the invention, serves to explain the principles of the invention.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

General Description

The basic geometric properties of any optical grating follow from the grating equation (Equation 1) that expresses the condition for constructive interference from successive periodic elements on a surface and that relates the incidence angle $\theta_i$, the diffracted angle $\theta_m$ for order m, and the ratio of the wavelength $\lambda$ to groove spacing d:

$$\sin \theta_m = \sin \theta_i + m\lambda/d. \quad (1)$$

For a reflection grating used in a first-order Littrow mount (m=−1), the angle of incidence is fixed by the condition $\sin \theta_i = \lambda/2d$. Only specular reflection (m=0) and evanescent orders occur when $\lambda/d>2$, whereas, for the range $2>\lambda/d>2/3$, two propagating orders occur (m=0 and retro-diffraction m=−1).

As opposed to mirrors or flat reflective surfaces wherein only the index of refraction and absorption of the metallic layer(s) determine the reflectivity, the efficiency (i.e., the distribution of energy among the various orders) of a grating additionally depends upon the wavelength and the polarization of incident light, the characteristics of the grating profile, details of the deposition method, and amount of material to be deposited. It is therefore surprising and unexpected that such a coating of the present invention can be deposited on optical materials having non-planar profiles, such as in optical gratings, because the amount of silver and the amount of an example nitride overcoat deposited to protect the silver from, such as, but not limited to, oxidation effects without affecting the reflectance is not easily determined and is markedly different than that required on a flat surface.

The groove profile of a grating depends on the method of manufacture and differs among gratings, such as ruled gratings (triangular profiles), holographic gratings (often sinusoidal profiles), and etched lamellar gratings (rectangular or fin profiles). The present invention includes the application of an adhesion layer, a layer of silver, and a layer of protective admix and/or overcoat into such groove profiles exemplified by diffraction gratings. As another arrangement, one or more additional layers, such as durability layers to protect the underlying materials from contamination and to provide further mechanical stability can also be applied to such gratings without departing from the scope of the invention. Such a similar coating for mirrors or flat reflective surfaces is described in some detail in U.S. Pat. No. 6,078, 425, titled "Durable Silver Coating For Mirrors", to Wolfe, et al, which is incorporated herein by reference as discussed above.

Accordingly, the approach utilized in the present invention requires knowledge of the interplay between the grating profile, i.e., the depth and shape, and the properties of an applied overcoat so as to provide durable (i.e., an increased resistance to optical damage and tarnishing) efficient gratings that outperform conventional grating devices, and that can be easily stripped and re-deposited without modifying underlying grating structure Specific Description A beneficial durable coating of the present invention is fabricated by sandwiching a layer of silver between a pair of Nickel-Chrome-Nitride ($NiCrN_X$) layers. A first $NiCrN_X$ layer operates as an adhesion layer and is designed to have a thickness from about 3 to about 300 angstroms (Å). A silver (Ag) layer is then deposited on the first $NiCrN_X$ layer to a thickness from about 1000 to about 10,000 Å, more often to a thickness of about 1500 Å. The thickness of the silver layer is adjusted to change the shape of the grating profiles as well as to provide high reflectivity. A second $NiCrN_X$ layer between about 3 and about 10 Å is then deposited on the silver layer and operates as a passivation layer. Such a passivation layer (i.e., barrier) protects the silver from tarnishing by physically blocking the migration of atmospheric contaminants to the silver. Specifically, it is believed that the $NiCrN_X$ admixes with the silver layer and ties up electrons in the silver metal matrix, which reduces or prevents deterioration, such as corrosion over time due to atmospheric contaminants.

Figure 1:
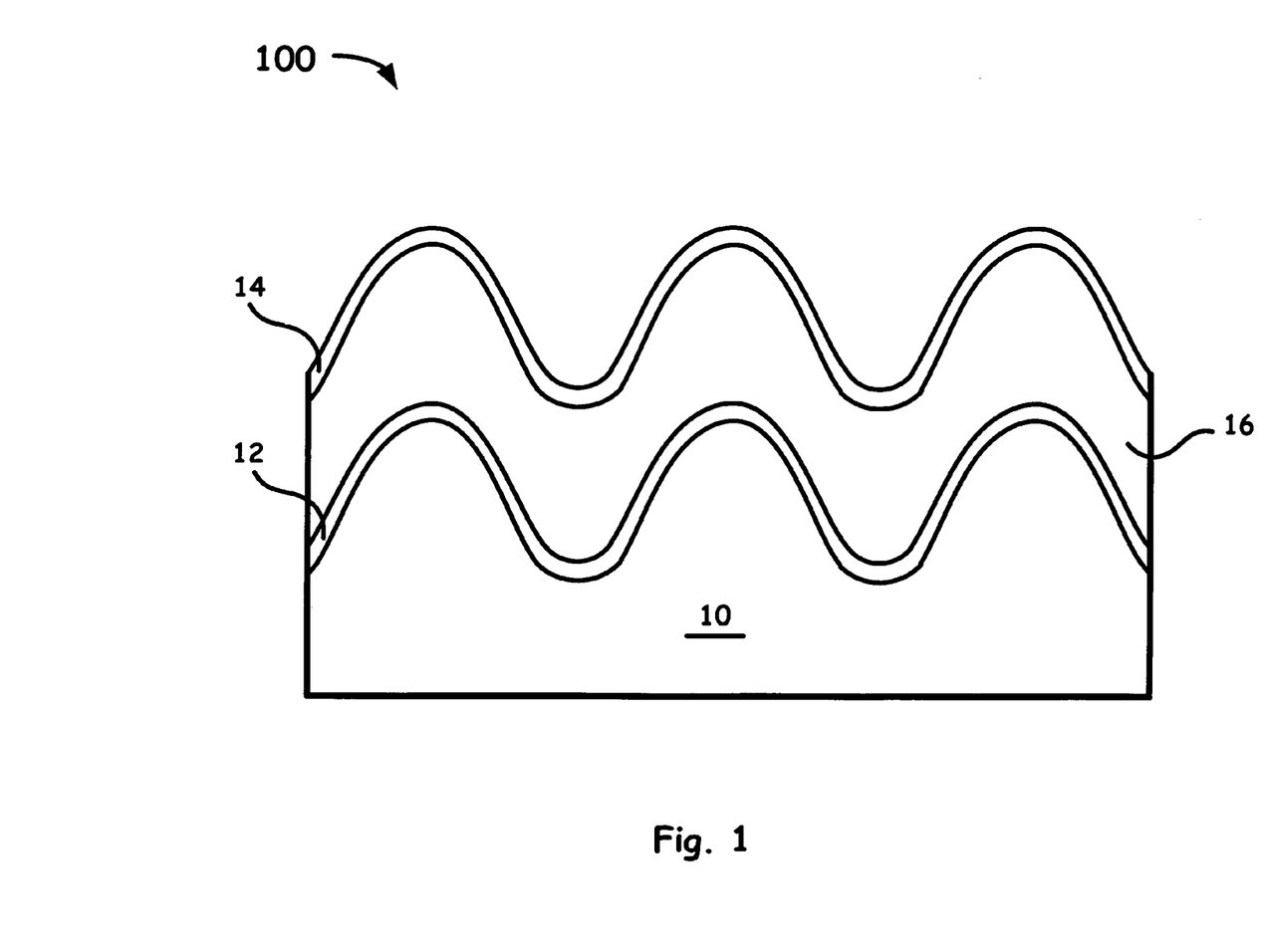
FIG. 1 shows a cross-section of multi-layer film of the present invention deposited on an optical grating.

FIG. 1 shows a cross-section of a beneficial thin film multilayer coating on substrate 10 having a non-planar profile and is generally designated as reference numeral 100. In this embodiment, an adhesion layer 12 is deposited on a substrate 10. A silver layer 16 is deposited next, and then a passivation layer 14 overlays silver layer 16.

Adhesion layer 12 facilitates the adhesion of silver layer 16 to substrate 10. Adhesion layer 12 is comprised of nickel or chromium metal, an alloy of nickel and chromium (NiCr), a nitride of nickel or chromium (NiN$_x$), (CrN$_x$), or a composite nitride of nickel-chromium (NiCrN$_x$). Since the stoichiometry of the nitride may not be known or is variable, the nitride is denoted as N$_x$. Beneficial adhesion layer materials are NiCr alloys and NiCrN$_x$.

The proportions or ratio of nickel to chromium by weight (Ni:Cr) in an adhesion layer can vary over the entire range, i.e., all points between 100% Ni to 100% Cr and the selection of the Ni:Cr ratio for NiCr and NiCrN$_x$ is determined by the application of the optical grating.

Often an adhesion layer is a thin film of NiCrN$_x$, having a thickness between about 3 and about 300 angstroms (Å) and a Ni:Cr ratio of about 20Ni:80Cr. Nickel-chromium nitrides (NiCrN$_x$) can be formed into thin layers, which is beneficial since thin layers absorb less light and thus have a less adverse effect on reflectance. The NiCr or NiCrNx layers may be sputtered onto a substrate having a non-planar profile or deposited by chemical vapor deposition, electron beam evaporation, or other techniques known in the art.

Turning again to FIG. 1, passivation layer 14 is deposited on silver layer 16 and can be formed from the same group of materials as adhesion layer 12. Adhesion layer 12 and passivation layer 14 in a multilayer arrangement may have the same composition, or the two layers may be different. Changing the ratio of Ni:Cr can increase the durability of the layer (at higher ratios) and decrease the absorption of the layer (at lower ratios). The lower absorption allows more reflection from, for example, a holographic optical grating that is used as a non-planar substrate for the present invention. For an optical grating subjected to a particularly harsh environment, it may be beneficial to use a higher Ni:Cr material for the passivation layer, which is closer to the top of the multilayer stack (and the environment), while using a lower Ni:Cr material for the adhesion layer underneath.

The passivation layer includes the same materials as the adhesion layer and chemically bonds with the silver reflective layer to form alloys. Such alloys are subsequently non-reactive with chlorine or sulfur compounds that are frequently found in the surrounding breathing atmosphere and accordingly, the silver is passivated with respect to these species of reactants.

Figure 2:
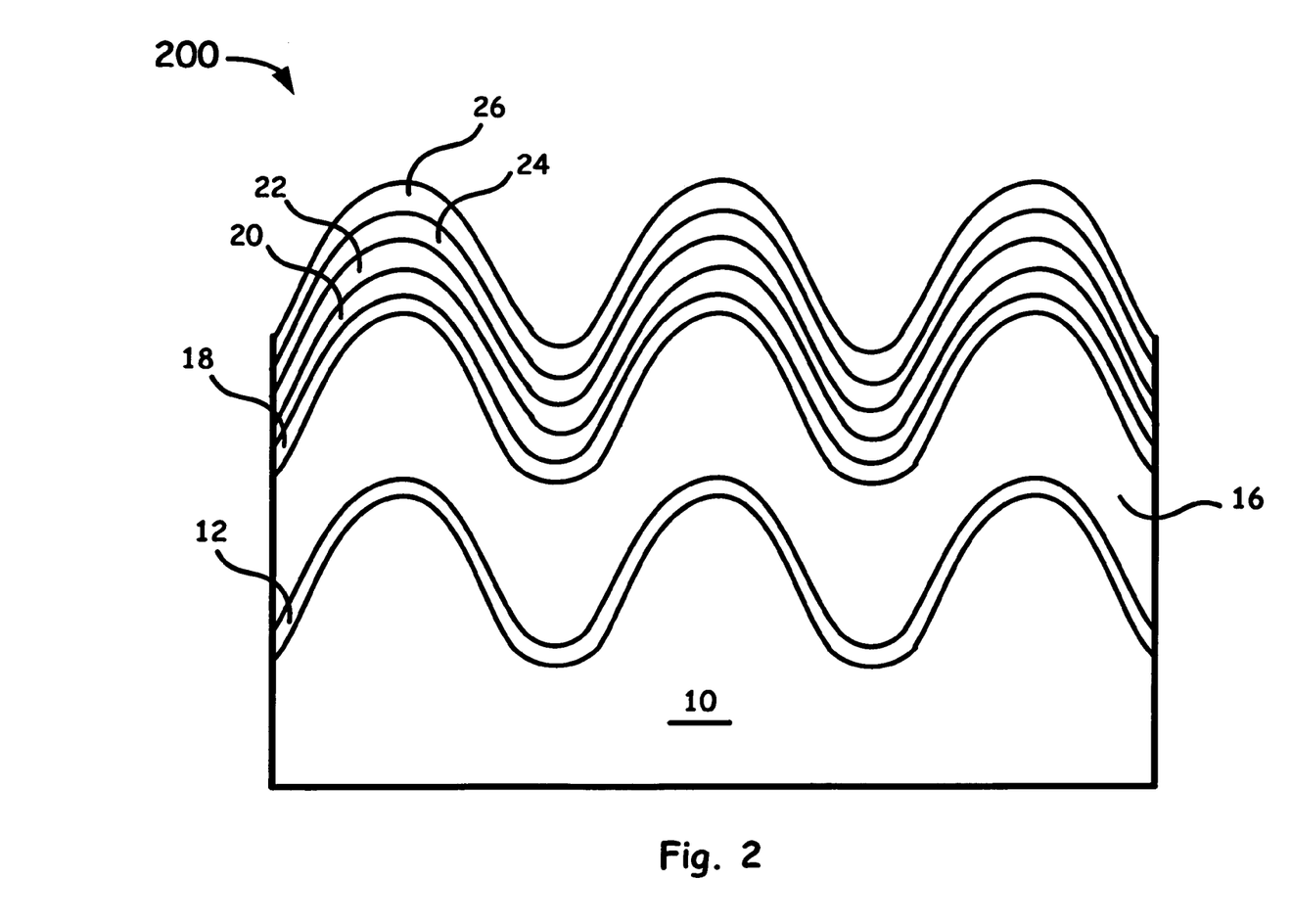
FIG. 2 shows a cross-section of multi-layer film of the present invention that includes durability layers.

FIG. 2 shows another embodiment and referenced by numeral 200, wherein one or more durability layers 20, 22, 24, 26 can be applied to multi-layer film 100 (i.e., substrate 10, and layers 12, 16, and 14 as shown in FIG. 1), specifically to passivation layer 18, to mechanically protect silver layer 16 in addition to providing another barrier to contaminants. A first durability layer 20, as shown in FIG. 2, as applied to substrate 10, is often silicon nitride, which may be followed by a series of layers 22, 24, 26 of various metal oxides. Suitable oxides include silica ($SiO_2$), alumina ($AlO_3$), niobia ($NbO_x$), titania ($TiO_2$), zirconia ($ZrO_2$), tantala ($Ta_2O_5$), and oxides of more than one metal (composite metal oxides), such as tantala hafnia ($TaHfO_x$). Niobium oxide forms a low-stress film and is used in applications for extremely high light intensities since it is inherently more resistant to stress-induced failures. Niobium oxide is also highly resistant to solarizing, or the forming of color centers of displaced lattice atoms. Tantalum-hafnium oxides are particularly beneficial due to a unique combination of beneficial properties: high refractive index and low absorption, especially in the ultraviolet region.

If first durability layer 20 is silicon nitride, then a subsequent layer 22 may be silicon oxinitride ($SiO_xN_y$), followed by a layer 24 of silicon dioxide ($SiO_2$). The oxinitride (i.e., 22) then serves as a compatibility or transition layer that creates a better bond between the silicon nitride (i.e., 22) and the silicon oxide (i.e., 24). A beneficial thickness of this transition layer is from about 30 to about 75 Å, which allows the bonding to occur without interfering (degrading) with the optical properties (reflectance) of the thin film multilayer coating 10, as shown in FIG. 1. The silicon oxinitride can be fabricated by sputtering silicon in a gas mix of 75% $N_2$ and 25% $O_2$.

The thickness of the silicon nitride film is typically in the range from 0 to about 30 Å. Silicon nitride is a very dense film and provides mechanical strength. If the subsequent metal oxide layers are deposited by sputtering in the presence of oxygen, then the silicon nitride layer is necessary to act as a barrier to the diffusion of atomic oxygen produced in the deposition process. If the oxides are deposited by electron beam evaporation, then the silicon nitride layer is not required since free oxygen is not present to contaminate the silver layer. It is critical to keep oxygen ($O_2$, $O_3$) and its ions ($O^{2-}$) away from the silver layer, since silver reacts with oxygen to form oxide, which is less reflective than the silver thin film. The use of a nitride film is often a beneficial film, as it permits the subsequent overcoating of metal oxide layers without compromising the pre-existing silver layer.

In an alternative embodiment, first durability layer 20 may comprise a silicon aluminum nitride ($SiAlN_x$), an aluminum nitride, or two or more alternating layers of silicon nitride and aluminum nitride. The weight ratio of silicon to aluminum (Si:Al) in the composite silicon aluminum nitride can be varied depending on the particular application. For example, aluminum nitride is typically water soluble (unless deposited at high substrate temperatures), and thus would not be used in humid environments. High aluminum content would be favored in a dry environment.

If first durability layer 20 is an aluminum nitride or SiAlN$_x$ layer, then a subsequent layer 22 may be aluminum oxinitride ($AlON_x$) or silicon aluminum oxinitride ($SiAlO_xN_y$), followed by a layer 24 of aluminum oxide ($AlO_3$) or silica. The oxinitride (i.e., layer 22) then serves as a compatibility or transition layer that can bond easily to both the aluminum nitride (i.e., layer 20) and the alumina or silica (i.e., layer 24).

Figure 3A:
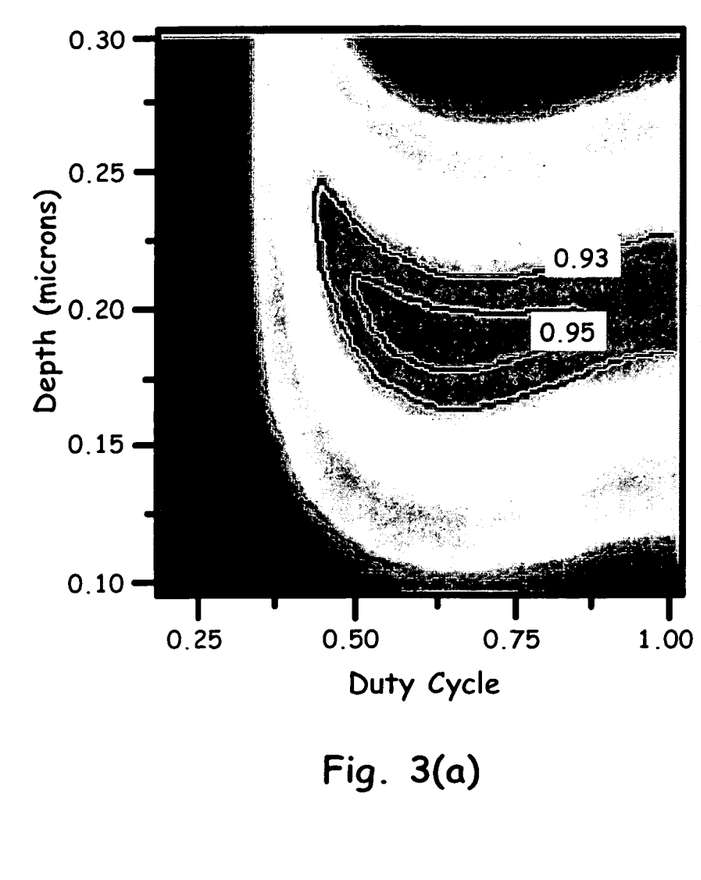
FIG. 3(a) shows theoretical −1 order diffraction efficiency of gold as a function of groove depth and duty cycle.
Figure 3B:
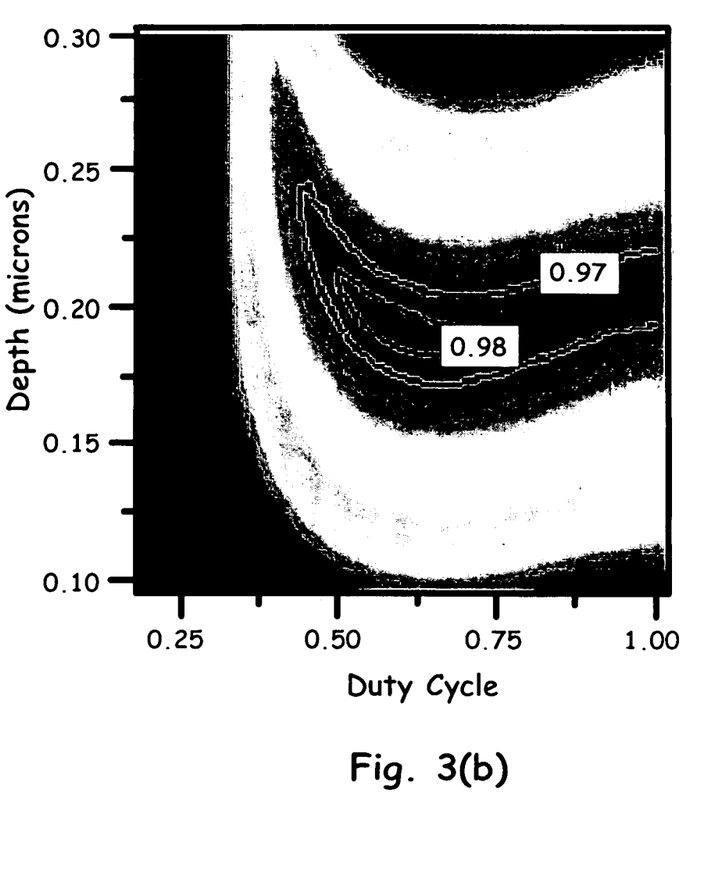
FIG. 3(b) shows theoretical −1 order diffraction efficiency of a durable silver coated grating as a function of groove depth and duty cycle.

FIG. 3(a) and FIG. 3(b) shows theoretical −1 order diffraction efficiency calculations of gold and silver as a grating overcoat respectively. In comparing a silver grating overcoat, as shown in FIG. 3(b), to a gold overcoat, as shown in FIG. 3(a), the theoretical parameter space for greater than 90% efficiency (e.g., from about 0.95 to about 0.98 at about 0.200 microns and from about 0.93 to about 0.97 microns at about 0.225 microns) is broadened when silver is used as compared to a more conventional gold overcoat. Actual tests with witness gratings having ½ of the surface being coated with gold and the other half coated with a durable silver coating results in an improvement of the −1 order diffraction efficiency from 0 to about 7% when comparing the silver-grating surface to the gold-coated surface on the same grating. Optimization of the grating shapes and deposition parameters can bring the performance of the coated grating of the present invention up to efficiencies predicted by the theoretical calculations.

Figure 4A:
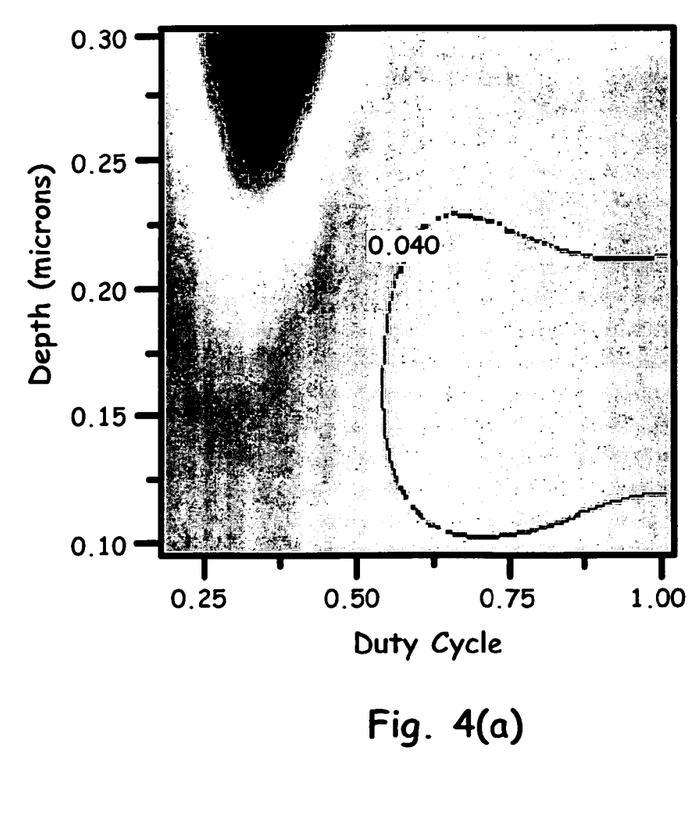
FIG. 4(a) shows theoretical absorption (fraction of light) of gold.
Figure 4B:
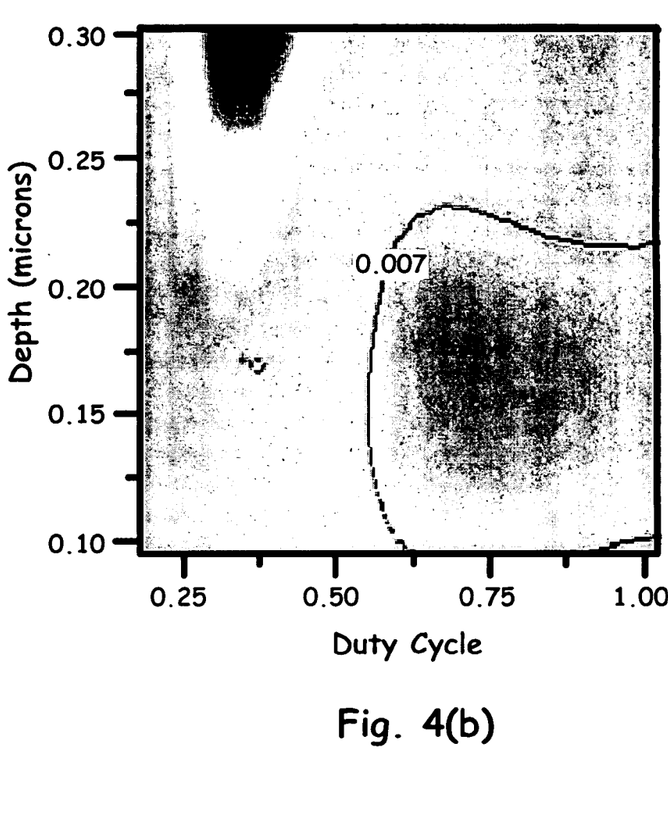
FIG. 4(b) shows theoretical absorption (fraction of light) of a durable silver coated grating.

FIG. 4(a) and FIG. 4(b) shows theoretical absorption (fraction of incident light) plots calculations of gold and silver as a grating overcoat respectively. The 0.007% absorption, as shown in FIG. 4(b), is approximately 6 times lower in absorption than the 0.040% absorption, as shown in FIG. 4(b), at an equivalent parameter space. Such a result indicates that the coated element disclosed herein suffers less deleterious heating effects, which results in greater power handling capacity with better wave-front quality and efficiency from a predetermined diffracted beam.

Figure 5:
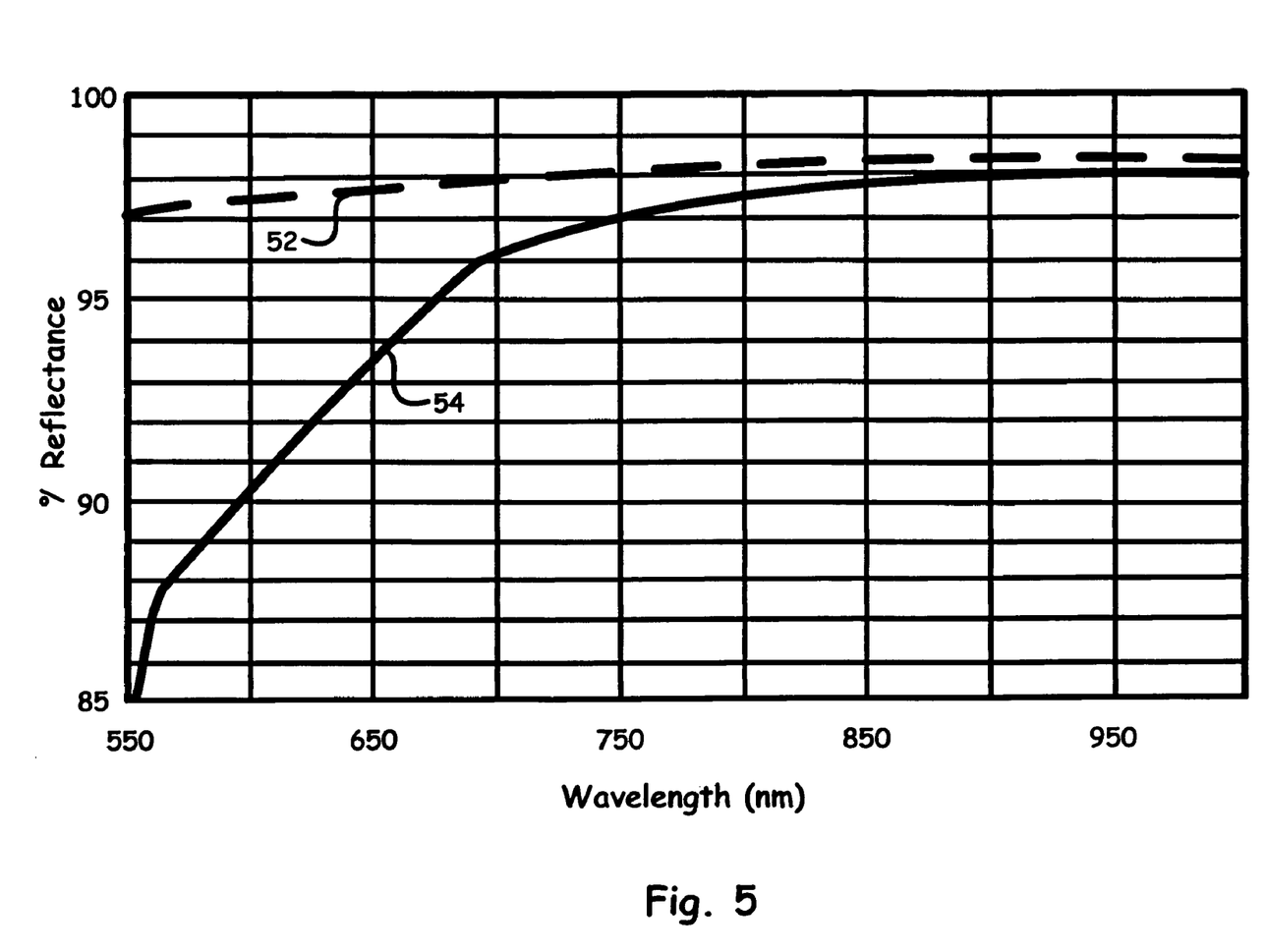
FIG. 5 illustrates the difference in reflection of 2000 angstroms of a gold coating versus silver.
Figure 6:
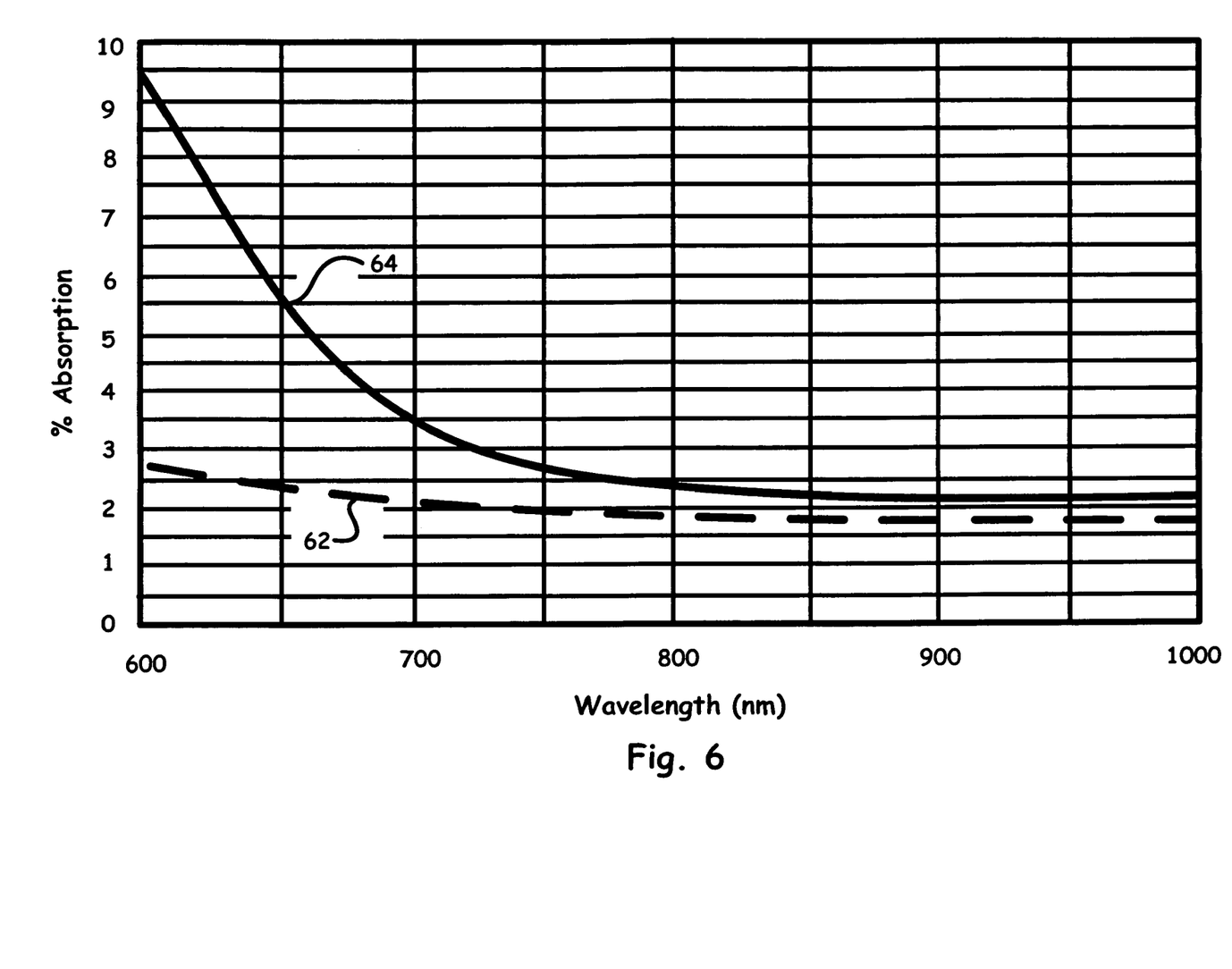
FIG. 6 illustrates the difference in absorption of 2000 angstroms of a gold coating versus silver.

FIG. 5 and FIG. 6 illustrate the improved reflectance and absorption properties of a durable silver coating utilized in the present invention versus a standard gold coating. While the coating of the present invention is capable of being utilized in a broad spectral range from about 4000 nm to about 50000 nm, FIG. 5 illustrates the superior modeled reflectance of 2000 angstroms of a silver coating 52 versus a gold coating 54 over a spectral range from about 550 nm to about 1000 nm. FIG. 6 similarly illustrates the superior modeled absorption of 2000 angstroms of a silver coating 62 versus a gold coating 64 over the same spectral range.

The foregoing description of preferred embodiments of the invention is presented for purposes of illustration and description and is not intended to be exhaustive or to limit the invention to the precise form disclosed. Many modifications and variations are possible in light of the above teaching.

The invention claimed is:

1. An optical element, comprising:
a non-planar profile substrate,
an adhesion layer, having a predetermined thickness deposited on said non-planar profile,
a layer comprising silver, having a predetermined thickness deposited on said adhesion layer; and
a passivation layer, having a predetermined thickness deposited on said silver layer.

2. The optical element of claim 1, wherein said non-planar profile comprises at least one profile selected from sinusoidal, triangular and rectangular profiles.

3. The optical element of claim 1, wherein said silver layer comprises a thickness in the range from about 1000 to about 10,000 Angstroms.

4. The optical element of claim 1, wherein said adhesion layer comprises a thickness in the range from about 3 to about 300 angstroms.

5. The optical element of claim 1, wherein said passivation layer comprises a thickness in the range from about 3 to about 10 angstroms.

6. The optical element of claim 1, wherein said adhesion layer comprises at least one material selected from the group consisting of: nickel, nickel nitride, chromium, chromium nitride, nickel-chromium alloys, silicon-nitride, and nickel-chromium nitride.

7. The optical element of claim 1, wherein said passivation layer comprises at least material selected from the group consisting of: nickel, nickel nitride, chromium, chromium nitride, nickel-chromium alloys, silicon-nitride, and nickel-chromium nitride.

8. The optical element of claim 1, wherein said optical element includes a diffraction efficiency of greater than about 90% for a predetermined spectral range.

9. An optical element, comprising:
a diffraction grating,
an adhesion layer having a predetermined thickness deposited on said diffraction grating, wherein said adhesion layer comprises at least one material selected from the group consisting of: nickel, nickel nitride, chromium, chromium nitride, nickel-chromium alloys, silicon-nitride, and nickel-chromium nitride,
a layer comprising silver having a predetermined thickness deposited on said adhesion layer,
a passivation layer having a predetermined thickness deposited on said silver layer, wherein said passivation layer comprises at least material selected from the group consisting of: nickel, nickel nitride, chromium, chromium nitride, nickel-chromium alloys, silicon-nitride, and nickel-chromium nitride; and
wherein a diffraction efficiency of greater than about 90% is achieved over a predetermined spectral range.

10. The optical element of claim 9, wherein said diffraction grating comprises at least one profile selected from sinusoidal, triangular and rectangular profiles.

11. The optical element of claim 10, wherein said silver layer comprises a thickness in the range from about 1000 to about 10,000 angstroms.

12. The optical element of claim 9, wherein said adhesion layer comprises a thickness in the range from about 3 to about 300 angstroms.

13. The optical element of claim 9, wherein said passivation layer comprises a thickness in the range from about 3 to about 10 angstroms.

14. The optical element of claim 9, wherein at least one durability layer is deposited on said passivation layer.

15. The optical element of claim 14, wherein said durability layer comprises at least one nitride selected from the group consisting of: silicon nitride, aluminum nitride, and silicon aluminum nitride.

16. The optical element of claim 15, wherein said durability layer further comprises an oxinitride layer deposited on said nitride layer.

17. The optical element of claim 15, wherein said durability layer further comprises a plurality of layers of metal oxides.

18. The optical element of claim 14, wherein said durability layers deposited on the passivation layer comprise a layer of silicon nitride, a layer of silicon oxinitride, and a layer of silicon dioxide.

19. The optical element of claim of 14, wherein the durability layers deposited on the passivation layer comprise a layer of silicon aluminum nitride, a layer of silicon oxinitride, and a layer of silicon dioxide.

20. The optical element of claim 14, wherein the durability layers deposited on the passivation layer comprise a layer of aluminum nitride, a layer of aluminum oxinitride, and a layer of aluminum oxide.

21. The optical element of claim 14, wherein the durability layers comprise a plurality of layers of metal oxides.

22. The optical element of claim 21, wherein the durability layers comprise metal oxides selected from the group consisting of: silicon dioxide, titanium dioxide, aluminum oxide, tantalum hafnium oxide, tantalum oxide, niobium oxide, zirconium oxide, and mixtures thereof.

23. A method, comprising:
providing a non-planar profile substrate,
depositing an adhesion layer having a predetermined thickness on said non-planar profile, wherein said adhesion layer comprises at least one material selected from the group consisting of: nickel, nickel nitride, chromium, chromium nitride, nickel-chromium alloys, silicon-nitride, and nickel-chromium nitride, depositing a layer of silver having a predetermined thickness on said adhesion layer; and depositing a passivation layer having a predetermined thickness on said silver layer, wherein said passivation layer comprises at least one material selected from the group consisting of: nickel, nickel nitride, chromium, chromium nitride, nickel-chromium alloys, silicon-nitride, and nickel-chromium nitride.

24. The method of claim 23, wherein said adhesion layer comprises a thickness in the range from about 3 to about 300 angstroms.

25. The method of claim 23, wherein said passivation layer comprises a thickness in the range from about 3 to about 10 angstroms.

26. The method of claim 23, wherein at least one durability layer is deposited on said passivation layer.

27. The method of claim 23, wherein said silver layer comprises a thickness in the range from about 1000 to about 10,000 angstroms.

28. The method of claim 23, wherein said non-planar profile comprises at least one profile selected from sinusoidal, triangular and rectangular profiles.

29. The method of claim 23, wherein said non-planar profile includes a diffraction grating.

* * * * *